United States Patent
Paul et al.

(10) Patent No.: US 12,472,141 B2
(45) Date of Patent: Nov. 18, 2025

(54) DRUG DELIVERY FOR INTERVERTEBRAL DISC PAIN MANAGEMENT

(71) Applicant: GLOBUS MEDICAL, INC., Audubon, PA (US)

(72) Inventors: David C. Paul, Phoenixville, PA (US); Amy Hill, Manayunk, PA (US)

(73) Assignee: Globus Medical, Inc., Audubon, PA (US)

( * ) Notice: Subject to any disclaimer, the term of this patent is extended or adjusted under 35 U.S.C. 154(b) by 0 days.

(21) Appl. No.: 18/067,344

(22) Filed: Dec. 16, 2022

(65) Prior Publication Data
US 2024/0197622 A1 Jun. 20, 2024

(51) Int. Cl.
A61K 9/00 (2006.01)
A61K 9/16 (2006.01)
A61K 45/06 (2006.01)

(52) U.S. Cl.
CPC .......... *A61K 9/0024* (2013.01); *A61K 9/0085* (2013.01); *A61K 9/1647* (2013.01); *A61K 45/06* (2013.01)

(58) Field of Classification Search
CPC .. A61K 9/0024; A61K 9/0085; A61K 9/1647; A61K 45/06
See application file for complete search history.

(56) References Cited

U.S. PATENT DOCUMENTS

2014/0271717 A1* 9/2014 Goshayeshgar ..... A61K 9/0085
514/724
2019/0117831 A1* 4/2019 Vernengo ................ A61L 27/50
2019/0343652 A1* 11/2019 Petersheim ........... A61F 2/4611
2021/0212949 A1* 7/2021 Xie ........................ A61L 27/227

OTHER PUBLICATIONS

Lin, Xia, et al. "Effect of size on the in vitro/in vivo drug release and degradation of exenatide-loaded PLGA microspheres." Journal of Drug Delivery Science and Technology 45 (2018): 346-356.) (Year: 2018).*
Goodman, Stuart B., et al. "The future of biologic coatings for orthopaedic implants." Biomaterials 34.13 (2013): 3174-3183 (Year: 2013).*
Laubach, Markus, Philipp Kobbe, and Dietmar W. Hutmacher. "Biodegradable interbody cages for lumbar spine fusion: current concepts and future directions." Biomaterials 288 (Aug. 8, 2022): 121699. (Year: 2022).*
Goodman, Stuart B, The Future of Biological Coatings for Orthopedic Implants, Biomaterials: 34, 13, pp. 3174-3183. (Year: 2013 ).*
Laubach et al, Biodegradable Interbody Cages for Lumbar Spine Fusion: Current Concepts and Future Directions, Biomaterials 288, 121699. (Year: 2022).*

* cited by examiner

Primary Examiner — Carlos A Azpuru

(57) ABSTRACT

Biomaterials, implants, methods of making the biomaterial and implants, methods of providing pain relief by administering the biomaterial or implant to a patient, and kits that include such biomaterials, implants, or components thereof. The biomaterials may include microparticles including one or more active pharmaceutical agents, such as anesthetics, antibiotics, and corticosteroids, which help to provide pain relief over an extended period of time. The biomaterials may be applied directly to the intervertebral disc or in the disc space to provide direct therapy for the management of disc pain.

20 Claims, 8 Drawing Sheets

DRUG DELIVERY FOR INTERVERTEBRAL DISC PAIN MANAGEMENT

FIELD OF THE INVENTION

The present application relates generally to drug delivery for intervertebral disc pain management including controlled drug release to maintain a therapeutic target dose for an extended period of time that targets the intervertebral disc.

BACKGROUND OF THE INVENTION

Low back pain may be common in up to 80% of the population in their lifetime. Intervertebral disc pathologies, including disc degeneration and herniation, are a common cause of low back pain. Disc degeneration may lead to nerve in-growth within the intervertebral disc, causing local pain within the disc. Disc herniation may cause radicular nerve compression or central spinal stenosis.

Typical treatments may include epidural steroid injections (ESI) for pain management, the effects of which may last for about 3 months. This treatment may be applied to the epidural space, but does not provide pain relief caused by disc pain. Additionally, the injections pose a potential risk for infection leading to epidural abscess, meningitis, osteomyelitis, discitis, or soft tissue abscess. When these treatment options fail to reduce pain, the next step is often surgical intervention. Thus, there is a need for an improved treatment of disc pain that targets the intervertebral disc.

SUMMARY OF THE INVENTION

To meet this and other needs, biomaterial compositions and implants are configured to release medication over time and may be reabsorbed, thereby allowing for direct therapy of an intervertebral disc for the management of disc pain. The biomaterial compositions or implants may include a plurality of microspheres containing one or more medications, such as antibiotics, drugs, therapeutic agents, or a combination thereof. The microspheres are configured with a pre-determined resorption rate necessary to maintain a desired therapeutic dose of the medication(s). In one embodiment, the composition is an injectable therapy such that the microspheres are suspended in a biocompatible hydrogel. In another embodiment, the composition forms an implant or spacer configured to be implanted into a disc space, which may be resorbed over time. In yet another embodiment, the composition is a strip or sheet with embedded microspheres that may be rollable to improve insertion at a target site.

According to one embodiment, a composition for pain management includes a plurality of biodegradable microparticles loaded with active pharmaceutical agents including an anesthetic agent, an antibiotic agent, and an anti-inflammatory agent. The plurality of biodegradable microparticles provide controlled release of the active pharmaceutical agents to maintain a therapeutic target dose of each agent for a given duration of time. The composition is configured to be applied directly to a pain site for pain relief, for example, an intervertebral disc or disc space.

The pain relief composition may include one or more of the following features. The plurality of biodegradable microparticles may include a first set of biodegradable microparticles loaded with the anesthetic agent, a second set of biodegradable microparticles loaded with the antibiotic agent, and a third set of biodegradable microparticles loaded with the anti-inflammatory agent. The plurality of biodegradable microparticles may include a population of microparticles each having at least three biodegradable layers: a first layer loaded with the anesthetic agent, a second layer loaded with the antibiotic agent, and a third layer loaded with the anti-inflammatory agent. The microparticles may be suspended in a biocompatible hydrogel to form an injectable composition. The hydrogel may be a temperature sensitive hydrogel that undergoes a sol-gel transition at physiological temperatures and conditions. At least some of the microparticles may be composed of at least one selected from the group consisting of polydioxane, polylactic-co-glycolic acid (PLGA), poly-L-lactic acid (PLLA), polycaprolactone fumarate (PCLF), and combinations thereof. The microparticles may be spherical. The microparticles may form a structural implant. The microparticles may be embedded in a solid or semi-solid carrier sheet, which is rollable.

According to one embodiment, a composition for pain management includes a plurality of biodegradable microparticles loaded with active pharmaceutical agents including an anesthetic, an antibiotic, and a corticosteroid, and an excipient or carrier for supporting the biodegradable microparticles. The composition is configured to be applied directly to a pain site for extended pain relief. The time-release profile of the anesthetic is faster than the antibiotic and corticosteroid to provide acute relief, and the time-release profile of the corticosteroid is longer than the antibiotic and anesthetic to provide long term pain relief.

The pain relief composition may include one or more of the following features. The biodegradable microparticles may include a first set of biodegradable microparticles loaded with the anesthetic, a second set of biodegradable microparticles loaded with the antibiotic, and a third set of biodegradable microparticles loaded with the corticosteroid. The first set of biodegradable microparticles loaded with the anesthetic may have a smallest diameter, the third set of biodegradable microparticles loaded with the corticosteroid may have a largest diameter, and the second set of biodegradable microparticles loaded with the antibiotic may have an intermediate diameter between the smallest and largest diameters. The plurality of biodegradable microparticles may include a population of microparticles each having at least three biodegradable layers: a first layer loaded with the anesthetic, a second layer loaded with the antibiotic, and a third layer loaded with the corticosteroid. The first layer loaded with the anesthetic may be an outermost layer, the third layer loaded with the corticosteroid may be an inner layer, and the second layer loaded with the antibiotic may be an intermediate layer between the outermost layer and the inner layer. The plurality of biodegradable microparticles may include a population of microparticles having a single layer and a population of microparticles having multiple layers. The microparticles may be suspended in a biocompatible hydrogel to form an injectable composition, the microparticles may form a structural implant, the microparticles may be embedded in a solid or semi-solid carrier to form a rollable sheet, or another suitable form.

According to another embodiment, a method of alleviating disc pain in a subject in need thereof may include administering to an intervertebral disc of the subject a therapeutically effective amount of at least one composition containing at least one microparticle loaded with at least one active pharmaceutical agent including one or more anesthetics, antibiotics, and corticosteroids. The composition may be an injectable gel. The composition may be injected into the annulus fibrosis, the nucleus pulposus, or both of the intervertebral disc.

According to yet another embodiment, a method of alleviating intervertebral disc pain in a subject includes providing an implantable biomaterial including one or more active pharmaceutical agents, such as anesthetics, antibiotics, and corticosteroids; and administering the implantable biomaterial into a target site to facilitate pain reduction at the target site. The target site may include the annulus fibrosis and/or the nucleus of an intervertebral disc, the disc space, or another area of pain. The implantable biomaterial may form a standalone implant configured to be positioned between adjacent vertebrae or may be positioned in or near a cage or other suitable interbody device. The implant may include the microparticles embedded in a solid or semi-solid carrier sheet configured to form a rollable sheet.

According to yet another embodiment, a kit includes one or more biomaterials, implants, or components thereof described herein. For example, the kit may contain an injectable and/or implant of the biomaterial composition. The kit may contain biomaterial compositions of the same or different types. In addition, the kit may include other components known in the art, including, but not limited to, carriers or scaffolds, cages or interbody devices (e.g., titanium and/or polyether ether ketone (PEEK) spacers), allograft spacers, insertion tools, or the like.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION OF THE INVENTION

Figure 1:
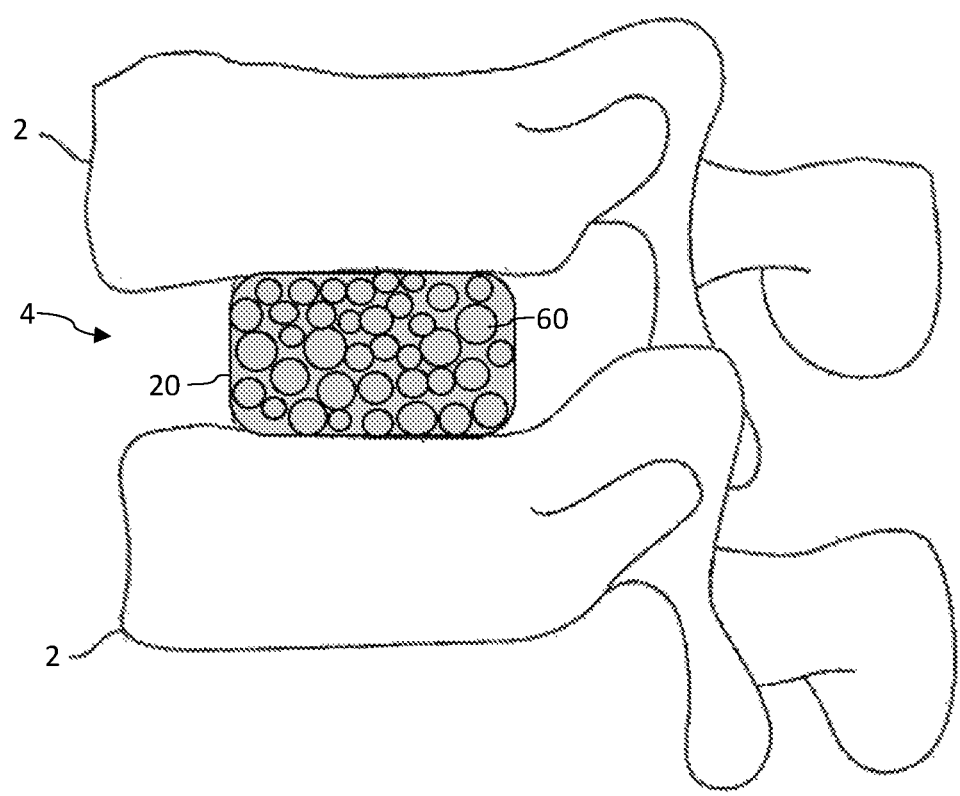
FIG. 1 depicts a side view of a biomaterial composition implanted in a disc space between adjacent vertebrae according to one embodiment.

The present application relates generally to biomaterial compositions and implants made therefrom, methods of making the biomaterial and implants, methods of pain management over a given period of time, and kits that include one or more of the biomaterials, implants, or additional components thereof. The biomaterial compositions may provide for direct therapy to the intervertebral disc for the management of disc pain, for example, due to degenerative disc disease. The compositions are configured to provide for controlled drug release to maintain a therapeutic target dose of each agent for an extended time. The compositions may also be resorbable such that it naturally dissolves or absorbs over a given duration of time (e.g., the period of desired pain relief), without requiring surgical extraction.

The formulation may include one or more active pharmaceutical ingredients, therapeutic agents, medicaments, or medications that are releasable over time. In one embodiment, the composition includes one or more active agents, such as antibiotics to reduce the risk of local infection at the injection site, anesthetics to provide acute relief and limit the pain associated with the injection itself, and/or corticosteroids to provide for longer term pain relief. The active agents may be contained within or on one or more microparticles. The microparticles may include spheres having one or more layers configured to release the active agents at desired amounts at given time intervals, thereby providing for the desired pain management response.

The composition may be in the form of an injectable therapy, an implantable spacer, a malleable strip, or another suitable form. In the case of an injectable therapy, the formulation may further include a gel excipient that may help to prevent migration of the microspheres into undesirable areas. The injectable delivery is minimally invasive and can occur in an outpatient center to reduce the cost, time and risk associated with the procedure. The implantable spacer may have a solid structure configured to resorb over time. The malleable strip may have increased stability and may be rollable to improve insertion at the target site.

Additional aspects, advantages and/or other features of example embodiments of the invention will become apparent in view of the following detailed description. It should be apparent to those skilled in the art that the described embodiments provided herein are merely exemplary and illustrative and not limiting. Numerous embodiments of modifications thereof are contemplated as falling within the scope of this disclosure and equivalents thereto.

Definitions

Unless defined otherwise, all technical and scientific terms used herein have the same meaning as commonly understood by one of ordinary skill in the art to which this invention belongs. Any methods and materials similar or equivalent to those described herein can be used in the practice or testing of the present invention.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value, for example numerical values and/or ranges, such as an amount, a temporal duration, and the like, is meant to encompass variations of ±20%, '10%, ±5%, ±1%, or ±0.1% from the specified value, as such variations are appropriate to perform the disclosed methods. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or therebelow. Furthermore, the phrases "less than about [a value]" or "greater than about [a value]" should be understood in view of the definition of the term "about" provided herein.

The terms "patient," "subject," "individual," and the like are used interchangeably herein, and refer to any animal, or cells thereof whether in vitro or in situ, amenable to the methods described herein. In certain non-limiting embodiments, the patient, subject, or individual is a mammal, a human mammal or a non-human mammal, such as primate, mouse, rat, pig, horse, ferret, dog, cat, cattle.

A "disease" is a state of health of an animal wherein the animal cannot maintain homeostasis, and wherein if the disease is not ameliorated then the animal's health continues to deteriorate. In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

A disease or disorder is "alleviated" if the severity of a sign or symptom of the disease or disorder, the frequency with which such a sign or symptom is experienced by a patient, or both, is reduced.

The terms "treatment", "treating" and the like are used herein to generally mean obtaining a desired pharmacological and/or physiological effect. The effect may be prophylactic in terms of completely or partially preventing a disease, disorder, or symptom thereof and/or may be therapeutic in terms of partially or completely curing a disease, disorder, or symptom thereof and/or adverse effect attributed to the disease and/or partially or completely providing therapeutic pain relief to the subject. The term "treatment" as used herein covers any treatment of a disease, disorder, condition, or symptom in a subject and may include: (a) preventing a disease or symptom from occurring in a subject; (b) inhibiting the disease or a symptom, i.e., arresting its development: or (c) relieving the disease or a symptom, i.e., relieving existing pain. In addition, "treating" or "treatment" does not require complete alleviation of signs or symptoms and does not require a cure to the ailment.

The term "derivative" refers to a small molecule that differs in structure from the reference molecule but may retain or enhance the essential properties of the reference molecule and may have additional properties. A derivative may change its interaction with certain other molecules relative to the reference molecule. A derivative molecule may also include a salt, an adduct, tautomer, isomer, or other variant of the reference molecule.

The term "pharmaceutically acceptable salt" refers to any pharmaceutically acceptable salt, which upon administration to the patient is capable of providing (directly or indirectly) a compound or agent as described herein. Such salts preferably are acid addition salts with physiologically acceptable organic or inorganic acids. Examples of the acid addition salts include mineral acid addition salts such as, for example, hydrochloride, hydrobromide, hydroiodide, sulphate, nitrate, phosphate, and organic acid addition salts such as, for example, acetate, trifluoroacetate, maleate, fumarate, citrate, oxalate, succinate, tartrate, malate, mandelate, methane sulphonate and p-toluenesulphonate. Examples of the alkali addition salts include inorganic salts such as, for example, sodium, potassium, calcium and ammonium salts, and organic alkali salts such as, for example, ethylenediamine, ethanolamine, N,N-dialkylenethanolamine, triethanolamine and basic amino acids salts. However, it will be appreciated that non-pharmaceutically acceptable salts also fall within the scope of the invention since those may be useful in the preparation of pharmaceutically acceptable salts. Procedures for salt formation are conventional in the art.

The terms "effective amount" and "pharmaceutically effective amount" refer to a sufficient amount of an agent to provide the desired biological result. That result can be reduction and/or alleviation of a sign, symptom, or cause of a disease or disorder, or any other desired alteration of a biological system. An appropriate effective amount in any individual case may be determined by one of ordinary skill in the art using routine experimentation.

A "therapeutically effective amount" refers to that amount which provides a therapeutic effect for a given condition and administration regimen. In particular, "therapeutically effective amount" means an amount that is effective to prevent, alleviate or ameliorate symptoms of the disease or prolong the survival of the subject being treated, which may be a human or non-human animal. Determination of a therapeutically effective amount is within the skill of the person skilled in the art.

As used herein, the term "pharmaceutical composition" refers to a mixture of at least one compound or agent with other chemical components and entities, such as carriers, stabilizers, diluents, dispersing agents, suspending agents, thickening agents, and/or excipients. The pharmaceutical composition facilitates administration of the compound or agent to an organism.

"Pharmaceutically acceptable" refers to those properties and/or substances which are acceptable to the patient from a pharmacological/toxicological point of view and to the manufacturing pharmaceutical chemist from a physical/chemical point of view regarding composition, formulation, stability, patient acceptance and bioavailability. "Pharmaceutically acceptable carrier" refers to a medium that does not interfere with the effectiveness of the biological activity of the active ingredient(s) and is not toxic to the host to which it is administered.

Throughout this disclosure, various aspects of the compositions may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Pain Relief Biomaterials and Implants

Embodiments described herein may be generally directed to pain relief biomaterials and implants made therefrom. Although biomaterials or implants may be discussed separately, it will be appreciated by one of ordinary skill in the art that the biomaterials described may be used in and of itself or may be used to create implants of different types, shapes, sizes, and orientations for a number of different clinical outcomes. Thus, the discussion of biomaterials may apply equally to the discussion on implants and vice versa.

The pain relief biomaterial includes a formulation or composition for delivering one or more active pharmaceutical ingredients, drugs, or therapeutic agents configured for the management of pain. In particular, the biomaterial may be configured to provide for direct pain therapy at the site of pain. The composition may be "biocompatible" as that term refers to the ability (e.g., of a composition or material) to perform with an appropriate host response in a specific application, or at least to perform without having a toxic or otherwise deleterious effect on a biological system of the host, locally or systemically. The biomaterial and/or implant may be "biologically degradable" or "resorbable" in that the material may be degraded, dissolved, absorbed, and/or resorbed, for example, by cellular absorption and/or hydrolytic degradation in a patient's body. In an exemplary embodiment, the composition is fully resorbable such that it naturally absorbs over a given duration of time (e.g., the period of desired pain relief), without requiring surgical extraction. The resorption rate may be tuned for the desired amount of release and/or duration of each of the therapeutic agents.

According to one embodiment, the biomaterial composition may be configured to provide pain relief at a target site. The target site can be, for example, the intervertebral disc including the annulus fibrosis and/or nucleus or the space between vertebrae if the disc, or a portion thereof, has been removed. It will also be appreciated that the composition may be implanted into a void, gap, or other defect or surgeon created opening in a bone, between bones, or other bony structure in a body of a patient. For example, the biomaterial composition can be configured to prevent pain at a target site in the spine, pelvis, an extremity, the cranium, or another bone, between bones, or bony structure in the patient's body. The biomaterial composition may be configured to be directly implanted or otherwise disposed at or in contact with the target site.

The biomaterial may be an injectable or may be formed into a specific size and shape for a desired application. For example, the implant may have a footprint suitable for cervical, thoracic, or lumbar applications. The implant may be shaped, for example, in the form of a sheet, strip, ring, cylinder, plug, cage, or the like. The implant may be provided with one or more openings or windows suitable to be filled with the biomaterials described herein or other graft materials known in the art. The implant may be used alone or in combination with a separate cage, frame, allograft, autograft, graft material, or other biomaterials known in the art. The implants may be suitable for an anterior, posterior, lateral, oblique, anterolateral, transforaminal approach, or other suitable approach known in the art.

Turning now to FIG. 1, a biomaterial composition 20 is shown according to one embodiment. When targeting pain management, for example, at an intervertebral disc 6, the biomaterial composition 20 may be positioned in the disc space 4 between two adjacent vertebrae 2 and/or into the intervertebral disc 6. In one embodiment, the biomaterial 20 is injectable into the disc space 4 and/or directly into the intervertebral disc 6. The biomaterial 20 may be configured to break down and adsorb or resorb into the surrounding biological fluids, tissues, and/or bone over time.

Figure 2:
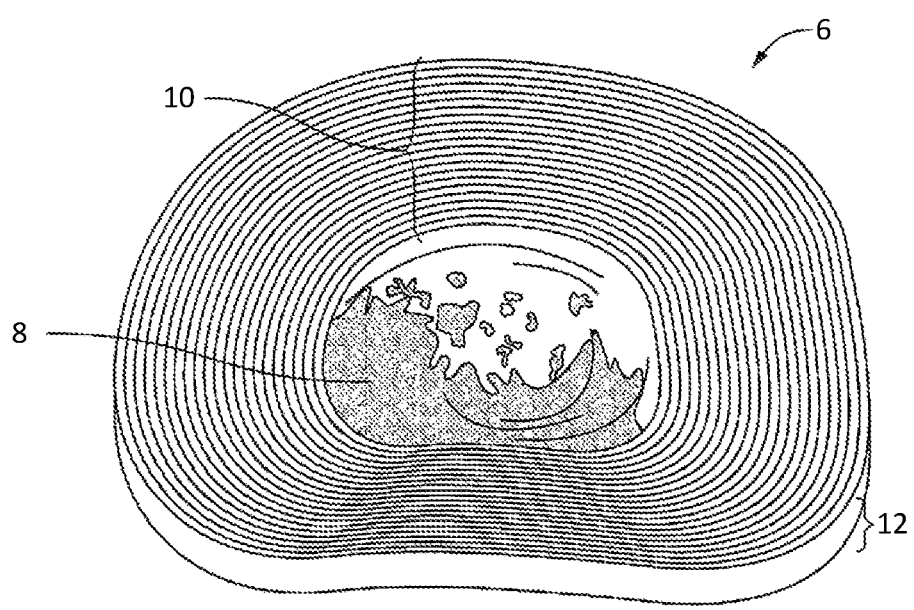
FIG. 2 is a perspective view of a healthy intervertebral disc.

With further emphasis on FIG. 2, the intervertebral disc 6 includes a gel-like center, the nucleus pulposus 8, surrounded by a fibrous ring, the annulus fibrosis 10. The relationship between the structure and function of the nucleus pulposus 8 and the annulus fibrosis 10 is essential to maintain health of the intervertebral disc 6. A healthy nucleus pulposus 8 exhibits hygroscopic properties. For example, as the disc 6 absorbs water, the intra-nuclear pressure increases, swelling the nucleus pulposus 8 expanding the height 12 of the disc, and in turn, tensioning the fibers of the annulus fibrosis 10. When there is deterioration or damage to the disc 6, pain may result. In this embodiment, a plurality of microparticles 60 may form an injectable fluid or gel or the microparticles may be suspended within a carrier to form a flowable fluid or gel. The fluid, semi-liquid, or gel-like biomaterial 20 may be injected directly into the nucleus 8 and/or the annulus fibrosis 10 of the intervertebral disc 6. In this manner, the therapeutic agent(s) in the biomaterial 20 may provide direct and acute pain relief at the site of the pain.

According to another embodiment, the biomaterial 20 may comprise a structural implant 22. The implant 22 may include an anterior lumbar interbody fusion (ALIF) spacer, a lateral lumbar interbody fusion (LLIF) spacer, a posterior lateral lumbar interbody fusion (PLIF) spacer, a transforaminal lumbar interbody fusion (TLIF) spacer, or other suitable spacer design. Examples of implant types are described in more detail, for example, in U.S. Pat. Nos. 10,682,238, and 10,744,003, which are incorporated by reference herein in their entireties for all purposes. In this embodiment, the implant 22 may engage the endplates of the adjacent vertebral bodies 2 and, in the installed position, maintain normal intervertebral disc spacing, restore spinal stability, and facilitate an intervertebral fusion until the implant 22 is fully resorbed.

Figure 3:
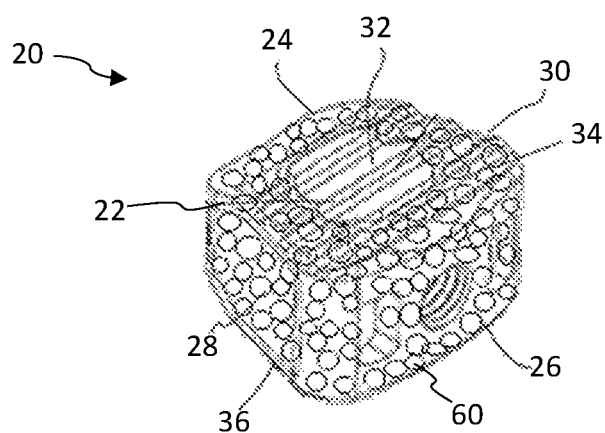
FIG. 3 is a perspective view of a structural biomaterial implant according to one embodiment.

By way of example as shown in FIG. 3, the implant 22 may have a body with a front end 24 configured to be inserted into the disc space 4, an opposite rear end 26, and side walls 28 and 30 extending therebetween. A plurality of microparticles 60 may form the implant 22 or may be embedded within or on a carrier to form a solid structure. An optional hollow interior chamber 32 configured to receive bone growth promoting materials, for example, may be defined through the body. The implant 22 has an upper surface 34 and a lower surface 36 configured to engage the adjacent vertebrae 2. The upper and lower surfaces 34, 36 may define a plurality of serrations, teeth, ridges, gripping or purchasing projections, keels or other texturing or friction increasing elements to aid in gripping the adjacent vertebral bodies 2.

The implant 22 may be configured to be placed down an endoscopic tube and into the disc space 4 between the adjacent vertebral bodies 2 in a minimally invasive manner. It will be appreciated that the structural implant 22 may be configured to absorb, resorb, dissolve, breakdown, and/or disappear over time. In this manner, the therapeutic agent(s) in the biomaterial 20 may provide direct and acute pain relief at the site of the pain for a given period of time until the implant 20 is fully resorbed.

Figure 4A:
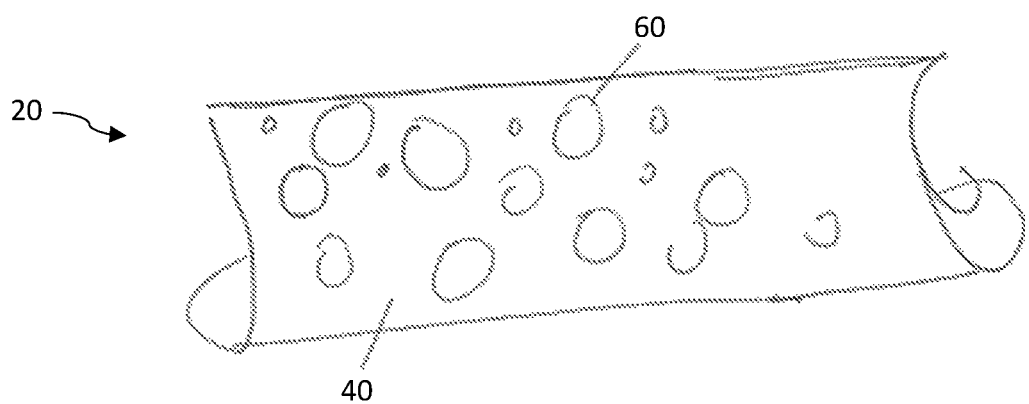
FIGS. 4A-4B depict a biomaterial composition of microparticles embedded in a rollable sheet according to one embodiment.
Figure 4B:
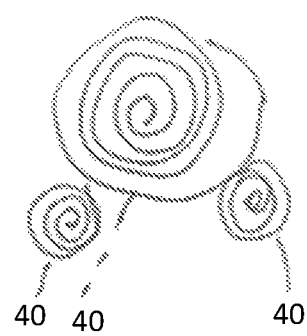

According to another embodiment, the biomaterial 20 may comprise a strip or sheet 40. As best seen in FIGS. 4A-4B, the sheet 40 may have a thin thickness with a given length and width. A plurality of microparticles 60 may form the strip or sheet 40 or may be embedded within or on a carrier forming a solid or semi-solid, sheet-like material. The sheet 40 may be generally rectangular or another suitable shape. Such sheets 40 may impart greater stability to the composition 20. In one embodiment, the carrier material may break down more slowly to delay the release of the embedded microparticles 60 with their loaded agents. The sheet 40 may be long enough to roll in upon itself to form a spiral shape. As shown in FIG. 4B (shown in cross-section), the sheet-like carrier material 40 may be rollable to improve insertion to the target site and promote the desired timed-release profile. In some embodiments, elongated rod shaped microparticles 60, or microparticle fibers, may be used within the sheets 40 and aligned such that the sheet-like carrier material may be rolled with the microparticle rods and/or fiber remaining substantially straight or unbent. The rolled sheets 40 may be placed down an endoscopic tube and into the target site in a minimally invasive manner. As shown, a plurality of sheets 40, near or contacting one another, may be placed where pain management is desired. The sheets 40 are configured to resorb over time to offer pain relief for the desired duration.

Microparticles

As described herein, the biomaterial composition 20 may be in the form of an injectable gel, structural implant 22, rollable strip 40, or other suitable application. In each embodiment, the biomaterial 20 includes a plurality of microparticles 60. The population of microparticles 60 is designed to deliver one or more agents to the targeted site of treatment. In particular, the microparticles 60 are configured to release active pharmaceutical agents configured to provide direct pain management at the target site.

The individual microparticles 60 may be of any suitable shape, such as spherical, ellipsoid, cylindrical, rod-shaped, or any combination of shapes. The individual microparticles may be generally uniform in diameter, or they may be variable in diameter. For example, in certain embodiments, the average diameter of microparticles of about the same volume (on a particle volume basis) may be in a range of between 0.01 µm to 1000 µm. In some embodiments, the average diameter may be between 1-500 µm, between 10-300 µm, or between 50-200 µm. In some embodiments, the microparticles have an average diameter of less than about 1000 µm, less than 800 µm, less than 600 µm, less than 400 µm, less than 200 µm, less than 100 µm, less than 80 µm, less than 60 µm, less than 40 µm, less than 20 µm, less than 10 µm, less than 8 µm, less than 6 µm, less than 4 µm, less than 2 µm, or less than 1 µm.

In some embodiments where the microparticles are cylindrical, rod-shaped or fibers, such microparticles may have their greatest linear length of between 0.1 and 5000 µm. Thus, in some embodiments the microparticles may have a greatest linear length of between 1-5000 µm, between 10-4000 µm, between 100-3000 µm, between 200-2000 µm, or between 500-1000 µm. In some embodiments the microparticles may have a greatest linear length of less than about 5000 µm, less than 4000 µm, less than 3000 µm, less than 2000 µm, less than 1000 µm, less than 800 µm, less than 600 µm, less than 500 µm, less than 400 µm, less than 200 µm, less than 100 µm, less than 80 µm, less than 60 µm, less than 40 µm, less than 20 µm, or less than 10 µm.

In some embodiments, the type of material forming at least part of a given microparticle 60 is a synthetic polymer. The microparticles 60 may be biodegradable or bioerodible, such that the microparticle material breaks down within the targeted treatment site and releases any agent that is on, in, encapsulated within or otherwise associated with that material. In some embodiments, the material is a polymer, such as homopolymers, copolymers, straight, branched-chain, or cross-linked derivatives.

Examples of biodegradable polymer materials may include, but are not limited to, polymers made of monomers such as esters, ethers, anhydrides, amides, orthoesters, which when degraded result in physiologically acceptable degradation products. Polymer materials may be crosslinked or non-crosslinked. Other biodegradable polymer materials may include polymers of hydroxyaliphatic carboxylic acids, either homo- or copolymers, and polysaccharides. Included among polyesters of interest are homo- or copolymers of D-lactic acid, L-lactic acid, racemic lactic acid, glycolic acid, caprolactone, and combinations thereof. For some copolymers of glycolic and lactic acid, biodegradation may be affected by the ratio of glycolic to lactic acid. Other non-limiting examples of polymers include: polydioxane, poly(lactic-co-glycolic acid) (PLGA), poly(lactic acid) (PLA), poly-L-lactic acid (PLLA), poly(glycolic acid) (PGA), poly(ε-caprolactone), polycaprolactone fumarate (PCLF), and poly(ortho ester), and other natural biodegradable polymers, such as collagen, chitosan, and poly(amino acid). In an exemplary embodiment, the synthetic microspheres may be derived from polydioxane, poly(lactic-co-glycolic acid) (PLGA), poly-L-lactic acid (PLLA), polycaprolactone fumarate (PCLF), and combination thereof. Combinations of any polymers described herein may also be used.

Figure 5A:
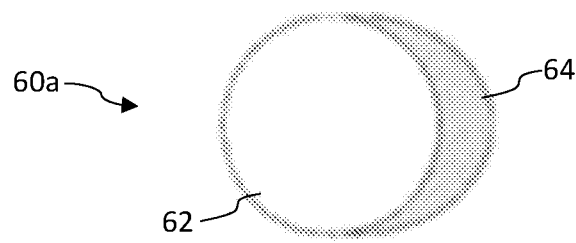
FIGS. 5A-5C depict examples of microparticles contained within the biomaterial composition having one or more layers.
Figure 5B:
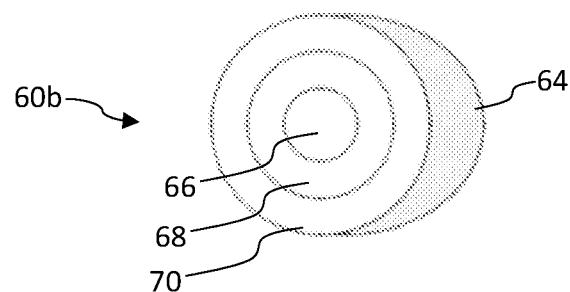
Figure 5C:
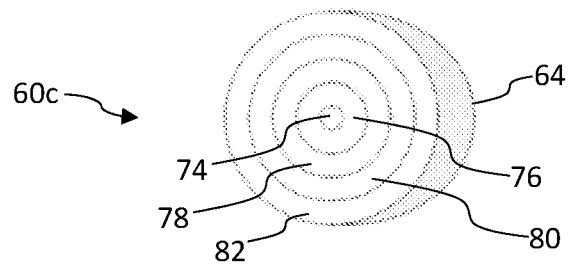

As contemplated herein, each microparticle 60 within a population of microparticles may include one or more layers or coatings. As used herein, a coating on a microparticle may also be considered a layer. In some embodiments, the microparticle has a single layer. In some embodiments, the microparticle has a plurality of layers, e.g., at least two layers, at least three layers, at least four layers, at least five layers, etc. For example and as shown in FIG. 5A, microparticle 60a may include a single layer 62 having an outer surface 64. In other words, the entire microparticle 60a is comprised of a single composition. In other embodiments, outer surface 64 may be a coating layer separate from layer 62. It should be appreciated that any coating may be considered its own layer. As shown in FIG. 5B, microparticle 60b may include at least three layers: an innermost layer 66, an intermediate layer 68, and an outermost layer 70 that forms an outer surface 64 of microparticle 60b. Intermediate layer 68 may be between innermost layer 66 and outermost layer 70. Intermediate layer 68 may be in contact with one or both of layers 66 and 70. As shown in FIG. 5C, microparticle 60c may have multiple intermediate layers, for example, at least five layers. For example, microparticle 60c may include a core or innermost layer 74, a first intermediate layer 76, a second intermediate layer 78, a third intermediate layer 80, and an outermost layer 82 forming outer surface 64 of microparticle 60c. Intermediate layer 76 may be in contact with one or more of layers 74 and 78. Intermediate layer 78 may be in contact with one or more of layers 76 and 80. Intermediate layer 80 may be in contact with one or more of layers 78 and 82. The thickness of each layers may be uniform or variable. It will be appreciated that any suitable number, thickness, and configuration of layers may be used to achieve the desired rate and duration of release and resorption.

In some embodiments, an outer layer fully encapsulates an inner layer. In some embodiments, an outer layer partially encapsulates an inner layer. In some embodiments, an outer layer covers only a portion of the surface of an adjacent inner layer that it is in contact with. In some embodiments, the layers are radial, such that outer layers fully or partially cover or partially encapsulate inner layers of the microparticle. In some embodiments, outer layers may be generally linear and partially cover or partially encapsulate the inner layers of a microparticle, such as a single side coating of a material layer onto a microparticle.

In another aspect, each layer of a given microparticle may be composed of a single material or a combination of materials. In some embodiments, a multilayer microparticle has each layer composed of the same material or material combination. In some embodiments, a multilayer microparticle has at least two layers composed of different materials or material combinations. For example, referring again to FIG. 5B, innermost layer 66 may be composed of a first material, intermediate layer 68 may be composed of a second material, and outermost layer 70 may be composed of a third material. In some embodiments, the first, second, and third materials are the same. In some embodiments, the first material is different from the second and/or third material. In some embodiments, the second material is different from the first and/or third material. In some embodiments, the third material is different from the first and/or second material. In some embodiments, the first, second and third materials are all different from each other.

In some embodiments, each layer may be a biodegradable material of between about 1% to about 100% of the microparticle by weight. For example, in some embodiments, any given layer may be between 1% and 99%, between 5% and 95%, between 10% and 90%, between 20% and 80%, between 30% and 70%, between 40% and 60%, or between 45% and 55% of the microparticle by weight. In some embodiments, the layer is about 100%, of the microparticle by weight, or less than or about 99%, less than or about 95%, less than or about 90%, less than or about 80%, less than or about 70%, less than or about 60%, less than or about 50%, less than or about 40%, less than or about 30%, less than or about 20%, less than or about 10%, less than or about 5%, less than or about 2%, less than or about 1%, less than or about 0.5%, less than or about 0.1%, or less than or about 0.01% of a microparticle by weight.

Each layer of a given microparticle may have a uniform thickness or variable thickness. It should be appreciated that the size and thickness of each layer of the microparticle may result in faster or slower resorption rates. The resorption rate may also depend on the material composition and the total surface area of the microparticle. For example, in some embodiments the microparticles or microparticle layers containing a first agent (e.g., an anesthetic) may resorb or elute faster, while microparticles or microparticle layers containing a second agent (e.g., a therapeutic drug) will resorb or elute slower, providing extended effect. Accordingly, the microparticles may be designed to have a resorption rate suitable for maintaining the desired therapeutic dose of any agent associated with each layer of the microparticle.

In some embodiments, an individual microparticle layer may have an average thickness of between 0.01 µm to 1000 µm. In some embodiments, the average thickness of an individual layer may be between 1-500 µm, between 10-300 µm, or between 50-200 µm. In some embodiments, the individual microparticle layers may have an average thickness of less than about 1000 µm, less than 800 µm, less than 600 µm, less than 400 µm, less than 200 µm, less than 100 µm, less than 80 µm, less than 60 µm, less than 40 µm, less than 20 µm, less than 10 µm, less than 8 µm, less than 6 µm, less than 4 µm, less than 2 µm, less than 1 µm, less than 0.5 µm, less than 0.2 µm, less than 0.1 µm, less than 0.05 µm, less than 0.02 µm, or less than 0.01 µm.

The microparticles described herein may be prepared using methods known in the art. For example, emulsification of a monomer/polymer material in a droplet phase into an aqueous phase containing an emulsion stabilizer results in an emulsion that when dried may form microparticles. Other techniques include utilization of a template having one or more open cavities. A layer of a microparticle forming composition is coated on the inner surface of the cavities and the composition is allowed to dry thereby forming an open shell or cup. The shell can then be filled with agents, other microparticles, or other materials, and subsequently covered with more of the microparticle forming composition. The microparticle is then released from the template. In still other embodiments, microparticles may be constructed via wet spinning via extruding a dissolved polymer in solvent into a coagulation bath to form rod shaped or elongated fiber microparticles.

Deliverable Agents

The microparticles may include one or more deliverable agents, such as active pharmaceutical ingredients, drugs, therapeutic agents, or combinations thereof. Each deliverable agent may provide a therapeutic effect configured to provide direct therapy to the target site. The microparticles provide for controlled release of the deliverable agent(s) to maintain the desired therapeutic target dose of each agent for the desired duration. The microparticle may include any suitable number of deliverable agents. For example, a given microparticle may include at least one agent, at least two agents, at least three agents, etc. In an exemplary embodiment, the microparticles contain at least three deliverable agents: an antibiotic, an anesthetic, and a corticosteroid.

Exemplary deliverable agents include drugs, active pharmaceutical ingredients, therapeutic compounds, detectable markers, or any other desired agent suitable for delivery to a subject. Examples of such deliverable agents include, but are not limited to, one or more drugs, proteins, amino acids, peptides, antibodies, antibiotics, analgesics, anti-inflammatory agents, anti-infection agents, anti-bacterial agents, antiviral agents, anti-fungal agents, anesthetics, small molecules, anti-cancer agents, chemotherapeutic agents, immunomodulatory agents, RNA molecules, siRNA molecules, DNA molecules, medical imaging agents, therapeutic moieties, vitamins, minerals, lipids, saccharides, metals, contrast agents, diagnostic agents, hormones, immunomodulators, muscle relaxants, osteoporosis agents, steroids, or any combinations thereof. It should be appreciated that any exemplary agent described herein includes a pharmaceutically acceptable salt thereof, a derivative, or a prodrug of the drug/agent.

In some embodiments, the deliverable agent includes at least one antibiotic, at least one anesthetic, and/or at least one anti-inflammatory, such as a corticosteroid. In some embodiments, a given microparticle may include any combination of antibiotics, anesthetics and anti-inflammatories.

Exemplary antibiotic agents or an anti-microbial agents include, without limitation, aminoglycoside antibiotics (e.g., apramycin, arbekacin, bambermycins, butirosin, dibekacin, neomycin, neomycin, undecylenate, netilmicin, paromomycin, ribostamycin, sisomicin, and spectinomycin), amphenicol antibiotics (e.g., azidamfenicol, chloramphenicol, florfenicol, and thiamphenicol), ansamycin antibiotics (e.g., rifamide and rifampin), carbacephems (e.g., loracarbef), carbapenems (e.g., biapenem and imipenem), cephalosporins (e.g., cefaclor, cefadroxil, cefamandole, cefatrizine, cefazedone, cefozopran, cefpimizole, cefpiramide, and cefpirome), cephamycins (e.g., cefbuperazone, cefmetazole, and cefminox), monobactams (e.g., aztreonam, carumonam, and tigemonam), oxacephems (e.g., flomoxef, and moxalactam), penicillins (e.g., amdinocillin, amdinocillin pivoxil, amoxicillin, bacampicillin, benzylpenicillinic acid, benzylpenicillin sodium, epicillin, fenbenicillin, floxacillin, penamccillin, penethamate hydriodide, penicillin o-benethamine, penicillin 0, penicillin V, penicillin V benzathine, penicillin V hydrabamine, penimepicycline, and phencihicillin potassium), lincosamides (e.g., clindamycin, and lincomycin), macrolides (e.g., azithromycin, carbomycin, clarithomycin, dirithromycin, erythromycin, and erythromycin acistrate), amphomycin, bacitracin, capreomycin, colistin, enduracidin, enviomycin, tetracyclines (e.g., apicycline, chlortetracycline, clomocycline, and demeclocycline), 2,4-diaminopyrimidines (e.g., brodimoprim), nitrofurans (e.g., furaltadone, and furazolium chloride), quinolones and analogs thereof (e.g., cinoxacin, ciprofloxacin, clinafloxacin, flumequine, and grepagloxacin), sulfonamides (e.g., acetyl sulfamethoxypyrazine, benzylsulfamide, noprylsulfamide, phthalylsulfacetamide, sulfachrysoidine, and sulfacytine), sulfones (e.g., diathymosulfone, glucosulfone sodium, and solasulfone), cycloserine, mupirocin and tuberin.

Additional nonlimiting examples of antibacterial agents include Acedapsone; Acetosulfone Sodium; Alamecin; Alexidine; Amdinocillin; Amdinocillin Pivoxil; Amicycline; Amifloxacin; Amifloxacin Mesylate; Amikacin; Amikacin Sulfate; Aminosalicylic acid; Aminosalicylate sodium; Amoxicillin; Amphomycin; Ampicillin; Ampicillin Sodium; Apalcillin Sodium; Apramycin; Aspartocin; Astromicin Sulfate; Avilamycin; Avoparcin; Azithromycin; Azlocillin; Azlocillin Sodium; Bacampicillin Hydrochloride; Bacitracin; Bacitracin Methylene Disalicylate; Bacitracin Zinc; Bambermycins; Benzoylpas Calcium; Berythromycin; Betamicin Sulfate; Biapenem; Biniramycin; Biphenamine Hydrochloride; Bispyrithione Magsulfex; Butikacin; Butirosin Sulfate; Capreomycin Sulfate; Carbadox; Carbenicillin Disodium; Carbenicillin Indanyl Sodium; Carbenicillin Phenyl Sodium; Carbenicillin Potassium; Carumonam Sodium; Cefaclor; Cefadroxil; Cefamandole; Cefamandole Nafate; Cefamandole Sodium; Cefaparole; Cefatrizine; Cefazaflur Sodium; Cefazolin; Cefazolin Sodium; Cefbuperazone; Cefdinir; Cefepime; Cefepime Hydrochloride; Cefetecol; Cefixime; Cefmnenoxime Hydrochloride; Cefmetazole; Cefmetazole Sodium; Cefonicid Monosodium; Cefonicid Sodium; Cefoperazone Sodium; Ceforanide; Cefotaxime Sodium; Cefotetan; Cefotetan Disodium; Cefotiam Hydrochloride; Cefoxitin; Cefoxitin Sodium; Cefpimizole; Cefpimizole Sodium; Cefpiramide; Cefpiramide Sodium; Cefpirome Sulfate; Cefpodoxime Proxetil; Cefprozil; Cefroxadine; Cefsulodin Sodium; Ceftazidime; Ceftibuten; Ceftizoxime Sodium; Ceftriaxone Sodium; Cefuroxime; Cefuroxime Axetil; Cefuroxime Pivoxetil; Cefuroxime Sodium; Cephacetrile Sodium; Cephalexin; Cephalexin Hydrochloride; Cephaloglycin; Cephaloridine; Cephalothin Sodium; Cephapirin Sodium; Cephradine; Cetocycline Hydrochloride; Cetophenicol; Chloramphenicol; Chloramphenicol palmitate; Chloramphenicol Pantothenate Complex; Chloramphenicol Sodium Succinate; Chlorhexidine Phosphanilate; Chloroxylenol; Chlortetracycline Bisulfate; Chlortetracycline Hydrochloride; Cinoxacin; Ciprofloxacin; Ciprofloxacin Hydrochloride; Cirolemycin; Clarithromycin; Clinafloxacin Hydrochloride; Clindamycin; Clindamycin Hydrochloride; Clindamycin Palmitate Hydrochloride; Clindamycin Phosphate; Clofazimine; Cloxacillin Benzathine; Cloxacillin Sodium; Cloxyquin; Colistimethate Sodium; Colistin Sulfate; Coumermycin; Coumermycin Sodium; Cyclacillin; Cycloserine; Dalfopristin; Dapsone; Daptomycin; Demeclocycline; Demeclocycline Hydrochloride; Demecycline; Denofungin; Diaveridine; Dicloxacillin; Dicloxacillin Sodium; Dihydrostreptomycin Sulfate; Dipyrithione; Dirithromycin; Doxycycline; Doxycycline Calcium; Doxycycline Fosfatex; Doxycycline Hyclate; Droxacin Sodium; Enoxacin; Epicillin; Epitetracycline Hydrochloride; Erythromycin; Erythromycin Acistrate; Erythromycin Estolate; Erythromycin Ethylsuccinate; Erythromycin Gluceptate; Erythromycin Lactobionate; Erythromycin Propionate; Erythromycin Stearate; Ethambutol Hydrochloride; Ethionamide; Fleroxacin; Floxacillin; Fludalanine; Flumequine; Fosfomycin; Fosfomycin Tromethamine; Fumoxicillin; Furazolium Chloride; Furazolium Tartrate; Fusidate Sodium; Fusidic Acid; Gentamicin Sulfate; Gloximonam; Gramicidin; Haloprogin; Hetacillin; Hetacillin Potassium; Hexedine; Ibafloxacin; Imipenem; Isoconazole; Isepamicin; Isoniazid; Josamycin; Kanamycin Sulfate; Kitasamycin; Levofuraltadone; Levopropylcillin Potassium; Lexithromycin; Lincomycin; Lincomycin Hydrochloride; Lomefloxacin; Lomefloxacin Hydrochloride; Lomefloxacin Mesylate; Loracarbef; Mafenide; Meclocycline; Meclocycline Sulfosalicylate; Megalomicin Potassium Phosphate; Mequidox; Meropenem; Methacycline; Methacycline Hydrochloride; Methenamine; Methenamine Hippurate; Methenamine Mandelate; Methicillin Sodium; Metioprim; Metronidazole Hydrochloride; Metronidazole Phosphate; Mezlocillin; Mezlocillin Sodium; Minocycline; Minocycline Hydrochloride; Mirincamycin Hydrochloride; Monensin; Monensin Sodium; Nafcillin Sodium; Nalidixate Sodium; Nalidixic Acid; Natamycin; Nebramycin; Neomycin Palmitate; Neomycin Sulfate; Neomycin Undecylenate; Netilmicin Sulfate; Neutramycin; Nifuradene; Nifuraldezone; Nifuratel; Nifuratrone; Nifurdazil; Nifurimide; Nifurpirinol; Nifurquinazol; Nifurthiazole; Nitrocycline; Nitrofurantoin; Nitromide; Norfloxacin; Novobiocin Sodium; Ofloxacin; Gatifloxacin Ormetoprim; Oxacillin Sodium; Oximonam; Oximonam Sodium; Oxolinic Acid; Oxytetracycline; Oxytetracycline Calcium; Oxytetracycline Hydrochloride; Paldimycin; Parachlorophenol; Paulomycin; Pefloxacin; Pefloxacin Mesylate; Penamecillin; Penicillin G Benzathine; Penicillin G Potassium; Penicillin G Procaine; Penicillin G Sodium; Penicillin V; Penicillin V Benzathine; Penicillin V Hydrabamine; Penicillin V Potassium; Pentizidone Sodium; Phenyl Aminosalicylate; Piperacillin Sodium; Pirbenicillin Sodium; Piridicillin Sodium; Pirlimycin Hydrochloride; Pivampicillin Hydrochloride; Pivampicillin Pamoate; Pivampicillin Probenate; Polymyxin B Sulfate; Porfiromycin; Propikacin; Pyrazinamide; Pyrithione Zinc; Quindecamine Acetate; Quinupristin; Racephenicol; Ramoplanin; Ranimycin; Relomycin; Repromicin; Rifabutin; Rifametane; Rifamexil; Rifamide; Rifampin; Rifapentine; Rifaximin; Rolitetracycline; Rolitetracycline Nitrate; Rosaramicin; Rosaramicin Butyrate; Rosaramicin Propionate; Rosaramicin Sodium Phosphate; Rosaramicin Stearate; Rosoxacin; Roxarsone; Roxithromycin; Sancycline; Sanfetrinem Sodium; Sarmoxicillin; Sarpicillin; Scopafingin; Sisomicin; Sisomicin Sulfate; Sparfloxacin; Spectinomycin Hydrochloride; Spiramycin; Stallimycin Hydrochloride; Steffimycin; Streptomycin Sulfate; Streptonicozid; Sulfabenz; Suifabenzamide; Sulfacetamide; Sulfacetamide Sodium; Sulfacytine; Sulfadiazinc; Sulfadiazine Sodium; Sulfadoxine; Sulfalene; Sulfamerazine; Sulfameter; Sulfamethazine; Sulfamethizole; Sulfamethoxazole; Sulfamonomethoxine; Sulfamoxole; Sulfanilate Zinc; Sulfanitran; Sulfasalazine; Sulfasomizole; Sulfathiazole; Sulfazamet; Sulfisoxazole; Sulfisoxazole Acetyl; Sulfisoxazole Diolamine; Sulfomyxin; Sulopenem; Sultamicillin; Suncillin Sodium; Talampicillin Hydrochloride; Teicoplanin; Temafloxacin Hydrochloride; Temocillin; Tetracycline; Tetracycline Hydrochloride; Tetracycline Phosphate Complex; Tetroxoprim; Thiamphenicol; Thiphencillin Potassium; Ticarcillin Cresyl Sodium; Ticarcillin Disodium; Ticarcillin Monosodium; Ticlatone; Tiodonium Chloride; Tobramycin; Tobramycin Sulfate; Tosufloxacin; Trimethoprim; Trimethoprim Sulfate; Trisulfapyrimidines; Trolcandomycin; Trospectomycin Sulfate; Tyrothricin; Vancomycin; Vancomycin Hydrochloride; Virginiamycin; Zorbamycin.

Exemplary anesthetics include, without limitation, local anesthetics such as marcaine, procaine (novocaine), chloroprocaine (nesacaine), cocaine, lidocaine, tetracaine (amethocaine, pontocaine), mepivacaine, etidocaine (duranest), bupivacaine (marcaine), dibucaine (cinchocaine, nupercaine), prilocaine (citanest), benzoxinate (dorsacaine), proparacaine (alcaine, opthaine, opthetic), benzocaine (anesthesin), or butamben (butesin).

Exemplary anti-inflammatory agents include, without limitation, non-steroidal anti-inflammatory drugs (NSAIDs), steroidal anti-inflammatory drugs, beta-agonists, anticholingeric agents, antihistamines (e.g., ethanolamines, ethylenediamines, piperazines, and phenothiazine), and methyl xanthines. Examples of NSAIDs include, but are not limited to, aspirin, ibuprofen, salicylates, acetominophen, celecoxib, diclofenac, etodolac, fenoprofen, indomethacin, ketorolac, oxaprozin, nabumentone, sulindac, tolmentin, rofecoxib, naproxen, ketoprofen and nabumetone. Such NSAIDs function by inhibiting a cyclooxgenase enzyme (e.g., COX-1 and/or COX-2). Examples of steroidal anti-inflammatory drugs include, but are not limited to, corticosteroids, glucocorticoids, dexamethasone, cortisone, hydrocortisone, prednisone, prednisolone, triamcinolone, azulfidine, and eicosanoids such as prostaglandins, thromboxanes, and leukotrienes.

The one or more deliverable agents may be associated with the microparticles and/or microparticle layers in any suitable way. For example, the agent may be blended into any given layer of a microparticle. In some embodiments, the agent is covalently linked to the polymeric material of a microparticle layer, such as via a cleavable moiety. In some embodiments, the agent is positioned on a surface of a microparticle layer. In some embodiments, the agent is positioned within the pores of a microparticle layer. In some embodiments, the agent is encapsulated within at least a portion of a microparticle layer.

The amount of an agent in a microparticle or microparticle layer may vary. In some embodiments, the agent may be between 1%-99% of the microparticle or microparticle layer by weight. In some embodiments, the agent may be equal to or at least about 1%, about 2%, about 5%, about 10%, about 20%, about 30%, about 40%, about 50%, about 60%, about 70%, about 80%, about 90%, about 95%, or about 99% of the microparticle or microparticle layer by weight.

Population of Microparticles

The formulation or composition and/or implant thereof for delivering therapeutic agents to a pain site may include a plurality of microparticles 60 and an optional excipient or carrier. The microparticles 60 may include a population of microparticles that are the same or different from one another. For example, the microparticles 60 may have varying diameters and/or varying numbers of layers, thereby having multiple release profiles base on the desired therapeutic effect. For example, larger microparticles may have extended pain management whereas smaller microparticles may resorb and elute faster providing acute pain therapy. Similarly, microparticles with a greater number of layers may have a longer duration than microparticles with a smaller number of layers. It will be appreciated that the type and duration of therapeutic effect may be tuned for a desired patient outcome based on the types of deliverable agents, the microparticle polymer composition, the number and/or thickness of layers, the diameter of the microparticles, and/or the quantity of microparticles.

Figure 6A:
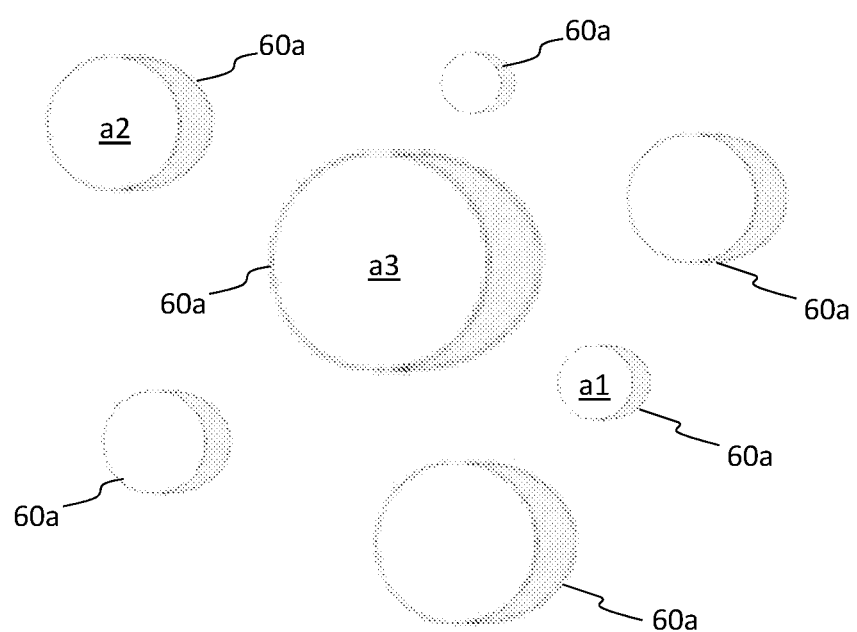
FIGS. 6A-6B depict examples of populations of microparticles with variable numbers of layers and types of agents.
Figure 6B:
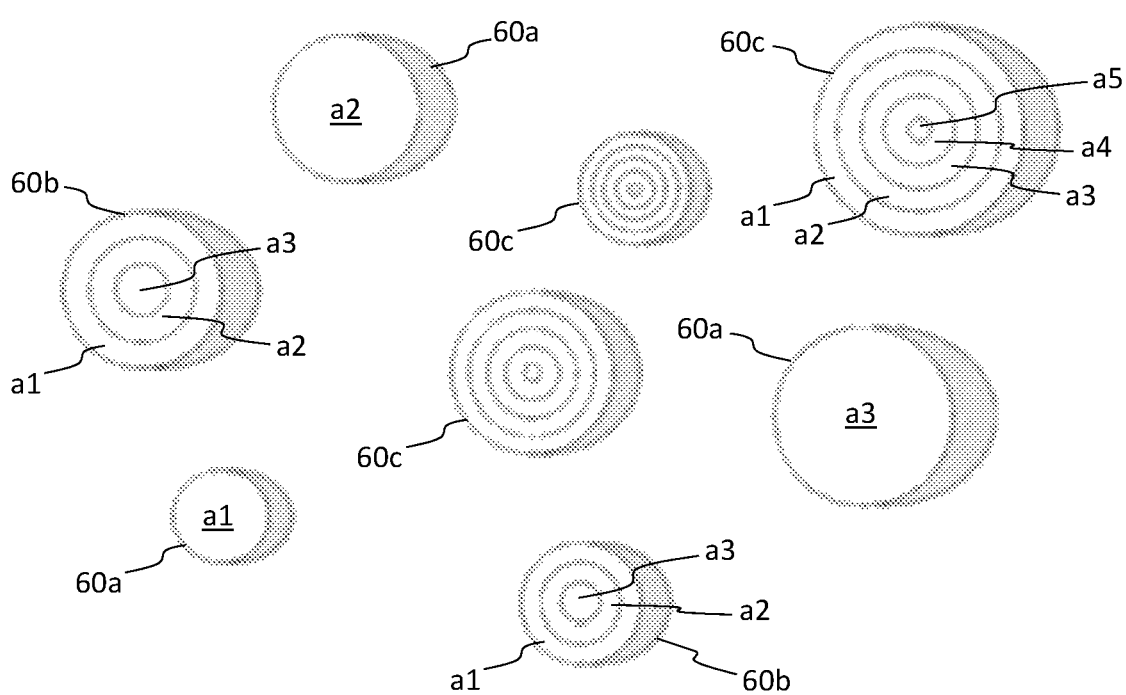

The composition of microparticles may include any combination of the microparticles described herein. FIGS. 6A-6B show examples of microparticle populations, which may be used for the desired pain management response. FIG. 6A shows one example of a population of microparticles 60a of the same type. In this case, the microparticles 60a are all single layer microparticles. Although it will be appreciated that all of the microparticles may be double layer microparticles, triple layer microparticles, etc. In one embodiment, a single type of microparticle 60a may have deliverable agents a1, a2, a3 associated therewith. For example, one microparticle may have a first agent a1, a second microparticle may have a second agent a2, and a third microparticle may have a third agent a3. It will be appreciated that more or less agents may be present and agents a1, a2, and/or a3 may be the same or different in each microparticle 60a.

In one exemplary embodiment, agent a1 may be an anesthetic to provide acute pain relief, agent a2 is an antibiotic to reduce the risk of local infection, and agent a3 is a corticosteroid to provide long term pain relief. In this embodiment, agent a1 (e.g., anesthetic) may have a small diameter to provide for fast release of agent 1. Agent a2 (e.g., antibiotic) may have a medium sized diameter to provide for additional release of agent 2. Agent a3 (e.g., corticosteroid) may have a larger diameter to provide for extended release of agent 3. It will be appreciated that the size of the microparticles, the contents of the microparticles (including the deliverable agents), and the quantity of microparticles may be selected to tune into the desired release of the deliverable agents over the desired duration of treatment.

In another example shown in FIG. 6B, the population of microparticles 60 may contain microparticles of different types (e.g., having different numbers of layers). For example, the population may include more than one type of microparticle 60a, 60b, 60c, with deliverable agents a1-a5. Each of agents a1-a5 may be the same or different, in any combination. As contemplated herein, a first agent being "different" from another agent may mean that they are chemically different, have different dosages, or both different chemically and by dosage. In this case, the microparticles 60 may include a group of single layer microparticles 60a, a group of triple layer microparticles 60b, and/or a group of five layer microparticles 60c. Although it will be appreciated that all of the microparticles may have any suitable number of layers for the desired therapeutic response. In one embodiment, single layer microparticles 60a may have one or more deliverable agents a1, a2, a3 associated therewith. The triple layer microparticles 60b may have at least three deliverable agents a1, a2, a3 (e.g., one agent associated with each layer). The five layer microparticles 60c may have at least five deliverable agents a1-a5 (e.g., one agent associated with each layer). It will be appreciated that more or less agents may be present and agents a1-a5 may be the same or different in each microparticle and/or cach layer.

In one exemplary embodiment, agent a1 may be an anesthetic to provide acute pain relief, agent a2 is an antibiotic to reduce the risk of local infection, and agent a3 is a corticosteroid to provide long term pain relief. In this embodiment, agent a1 (e.g., anesthetic) forms the outermost layer to provide for first release and fast release of agent 1. Agent a2 (e.g., antibiotic) may located in an intermediate layer to provide for second and additional release of agent 2. Agent a3 (e.g., corticosteroid) may be positioned at or near the core of the microparticles to provide for last and/or extended release of agent 3. Agents 4 and 5 may be the same or different from agents a1-a2. It will be appreciated that the size of the microparticles, the number and thickness of layers, the contents of the microparticles (including the deliverable agents), and the overall quantity of microparticles may be selected to tune into the desired release of the deliverable agents over the desired duration of treatment.

The microparticle compositions may include a range of release profiles (running substantially to completion), for example from essentially immediate release to an extended release over a given duration (e.g., up to many days, weeks, or months). In some embodiments, the release profile of a given microparticle or microparticle layer (running substantially to completion) may be less than 1 day, less than 12 hours, less than 8 hours, less than 6 hours, less than 4 hours, less than 2 hours, less than 1 hour, less than 30 minutes, less than 20 minutes, less than 10 minutes, less than 5 minutes, less than 2 minutes, less than 1 minute, less than 30 seconds, less than 10 seconds, or substantially immediate. In some embodiments, the release profile of a given microparticle or microparticle layer (running substantially to completion) may be greater than 1 hour, greater than 8 hours, greater than 1 day, greater than 2 days, greater than 1 week, greater than 1 month, greater than 2 months, greater than 3 months, greater than 4 months, greater than 5 months, greater than 6 months, greater than 7 months, greater than 8 months, greater than 9 months, greater than 10 months, greater than 11 months, or greater than 12 months. By preparing microparticles of various materials and/or various material layer thicknesses, each containing various forms and amounts of an agent, it is possible to prepare microparticles that release the one or more agents and sustain the agent concentration at the expected therapeutic amount or effect for an extended period.

By way of non-limiting example, the microparticles 60 may include a population of single layer microparticles 60a, being either substantially equal in size or variable in size, where each microparticle is loaded with agent a1, a2 and/or a3. In such embodiments, agent a1 may be a local anesthetic, agent a2 may be an antibiotic, and agent a3 may be an anti-inflammatory, such as a corticosteroid. In such embodiments, microparticles 60 loaded with a local anesthetic may be composed of a polymer with an immediate or fast-degrading profile to promote quick deployment of the local anesthetic to the injection site and target tissue. Further, those microparticles loaded with an antibiotic and/or an anti-inflammatory may have a slower degrading profile to promote longer lasting effect for the subject.

In another example, the microparticles 60 may include a first microparticle or an outer microparticle layer that is fast-degrading or fast-releasing to quickly release upon injection. Examples may include a local anesthetic agent such as novocaine and/or bupivacaine coated on or within the surface of the first microparticle or the outer layer of a microparticle. A second microparticle may be composed of one or more layers of PLGA and provide an initial release, a lag phase, and an extended release phase. Such microparticles or microparticle layers may include an antibiotic, such as vancomycin, or an anti-inflammatory such as a corticosteroid, which releases according to the PLGA release profile. A third microparticle may include a PLGA layer that is encapsulated in an outer layer of an even slower release polymer, such as PLA or polycaprolactone. This PLA or polycaprolactone outer layer may or may not have an agent associated therewith. Once the PLA layer degrades, the inner PLGA layer will subsequently degrade over an additional extended period, thereby releasing any agent associated therewith. Both the PLGA and the PLA or polycaprolactone layers may include a deliverable agent, such as an antibiotic (e.g., vanomycin) or an anti-inflammatory (e.g., corticosteroid) or any other agent described herein.

If the thickness of microparticle coatings varies within a plurality of microparticles, particles with thinner coatings may begin releasing drug before particles with thicker coatings. Thus, a range of coating thicknesses may help to control drug release over time. If the microparticles in a composition include a fiber or elongated rod-like microparticle, the fiber or rod like microparticle may include distinct segments along its length, each segment itself having different combinations and/or numbers of layers thereby providing even greater freedom in the design of the timed release of the loaded agents therein.

Excipient or Carrier

The formulation or composition and/or implant thereof for delivering therapeutic agents to a pain site may include a plurality of microparticles 60 and one or more optional excipients or carriers. The biomaterial composition 20 may include any desired carriers, stabilizers, excipients, additives, or the like depending on its nature and intended delivery method. By way of example, the biomaterial composition 20 may be in the form of an injectable gel, structural implant 22, rollable strip 40, or another suitable form.

In the case of an injectable gel, for example, the loaded microparticles may be suspended in a biocompatible gel, such as hydrogel. In some embodiments, the gel may be a temperature sensitive hydrogel that undergoes a sol-gel transition at physiological temperatures and conditions. As such, the solidifying or gelling media may trap microparticles as the formulation enters the targeted tissue.

By way of example, the carrier may include a hydrogel, including a reverse phase hydrogel or temperature sensitive hydrogel, such as a poloxamer (e.g., a PEO-PPO-PEO triblock copolymer). In particular, the poloxamer may include poloxamer 407, poloxamer P188, poloxamer P338, or the like. The poloxamer may also be chemically modified, for example, where one or more of the terminal hydroxyl groups are replaced with methoxy groups. Other suitable materials may include hyaluronic acid (HA), sodium alginate, saline or bone marrow aspirate, for instance. In some embodiments, the composition comprises a thermo-gelation material, such as gellan gum, methylcellulose, or a combination thereof. The carrier may be either water-based or non-water based.

In the case of a hydrogel, such as a poloxamer, hyaluronic acid, or alginate, the materials may be swellable in volume. For example, the carrier (e.g., poloxamer) may be mixed with water, a buffer, or an acid, such as hydrochloric acid, nitric acid, sulfuric acid, or the like, which causes the carrier to swell in volume. As will be recognized by one of ordinary skill in the art, swelling of the hydrogel may be influenced by a number of factors, such as temperature, surface area, molecular weight, degree of crosslinking, pH, or the like.

The carrier gel may be present in the composition at a concentration of about 0.5% to about 50% (w/v). In some embodiments, the carrier gel is present at a concentration of about 1-40% (w/v), about 2-30% (w/v), about 2-10% (w/v), or about 0.5-5% (w/v). For example, the carrier gel may be present at a concentration of about 0.5%, about 1%, about 2%, about 3%, about 4%, about 5%, about 6%, about 7%, about 8%, about 9%, or about 10% (w/v). In some embodiments, the composition comprises a material which accelerates the gelation time of the composition. Examples of such materials include, but are not limited to, calcium chloride, calcium bromide, calcium iodide, calcium lactate, and combinations thereof.

The size of the microparticles 60 and flowability of the carrier gel is preferably such that the biomaterial gel may be injectable through a minimum of a 20 gauge needle, a minimum 18 gauge needle, or a minimum 16 gauge needle. In this manner, the biomaterial gel or suspension should have a viscosity and viscoelasticity that enables flowablity through a syringe or other device while having sufficient viscosity to cause the gel to remain in the area(s) deposited via injection and not spread into surrounding areas.

In the case of a structural implant 22, the microparticles 60 may be fused together or may be dispersed through a carrier or applied onto a carrier, scaffold, or other structural support. For example, the implant carrier may include any of the synthetic polymers described for the microparticles 60 herein. Preferably, the carrier is composed of a biodegradable and/or bioerodible material, such that the carrier material breaks down in much the same way as the microparticles within the targeted treatment site. The microparticles may be located on, in, encapsulated within or otherwise associated with the carrier material. In one embodiment, the microparticles 60 are homogenously dispersed throughout the implant 22. In another embodiment, the implant 22 may be manufactured from a number of biocompatible materials including titanium, stainless steel, titanium alloys, non-titanium metallic alloys, polymeric materials, plastics, plastic composites, PEEK, ceramic, and elastic materials. In this case, the microparticles 60 or a mixture thereof may be applied onto the implant as a coating or may fill open areas in the implant, for example.

In the case of a sheet-like implant 40, the microparticles 60 may be embedded within, surface coated, or otherwise applied to a carrier substrate. For example, as shown in FIGS. 4A-4B, the microparticles 60 may be embedded within a carrier forming a solid or semi-solid, sheet-like material. Preferably, the carrier substrate is composed of a biodegradable and/or bioerodible material, such that the carrier material breaks down in much the same way as the microparticles within the targeted treatment site. Alternatively, the carrier substrate may be formed of another suitable biocompatible material, such as such as poloxamer, glycerol, carboxymethyl cellulose, or sodium hyaluronate. Such sheets may impart greater stability of the composition, where the carrier material breaks down more slowly to delay the release of the embedded microparticles with their loaded agents.

In some embodiments, the compositions may further include additional excipients, inactive ingredients, inert agents, or pharmaceutically acceptable carriers, such as a liquid or solid filler, stabilizer, dispersing agent, suspending agent, diluent, thickening agent, solvent or encapsulating material, involved in carrying or transporting the agent-loaded microparticles such that it may perform its intended function. Non-limiting exemplary materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations.

Non-limiting examples of stabilizers may include, e.g., starch, modified starch, and starch derivatives, gums, including but not limited to polymers, polypeptides, albumin, amino acids, thiols, amines, carboxylic acid, and any combinations or derivatives thereof. Other examples include, but are not limited to, xanthan gum, alginic acid, other alginates, benitoniite, veegum, agar, guar, locust bean gum, gum arabic, quince *psyllium*, flax seed, okra gum, arabinoglactin, pectin, tragacanth, scleroglucan, dextran, amylose, amylopectin, dextrin, etc., cross-linked polyvinylpyrrolidone, ion-exchange resins, potassium polymethacrylate, carrageenan (and derivatives), gum karaya, and biosynthetic gum. Other examples include polymers, such as polycarbonates (linear polyesters of carbonic acid); microporous materials (bisphenol, a microporous poly(vinylchloride), micro-porous polyamides, microporous modacrylic copolymers, microporous styrene-acrylic and its copolymers); porous polysulfones, halogenated poly(vinylidene), polychloroethers, acetal polymers, polyesters prepared by esterification of a dicarboxylic acid or anhydride with an alkylene polyol, poly(alkylenesulfides), phenolics, polyesters, asymmetric porous polymers, cross-linked olefin polymers, hydrophilic microporous homopolymers, copolymers or interpolymers having a reduced bulk density, and other similar materials, poly (urethane), cross-linked chain-extended poly(urethane), poly(mides), poly(benzimidazoles), collodion, regenerated proteins, semi-solid cross-linked poly(vinylpyrrolidone).

Methods of Treatment

The biomaterial composition 20, for example, in the form of an injectable gel, structural implant 22, rollable strip 40, or other suitable form, may be applied directly to a target site. In particular, the target site is likely the area of pain for the patient. In one embodiment, the area of pain is the intervertebral disc or disc space between adjacent vertebrae. It will be appreciated that the composition may be introduced into one or more target sites as deemed appropriate by a physician.

In one embodiment, the biomaterials and implants formed therefrom are intended to be applied directly at the pain site, e.g., one resulting from injury or defect. Although application to the intervertebral disc is exemplified herein, it will be appreciated that the biomaterials and/or implants may be utilized in a wide variety of orthopedic, periodontal, neurosurgical, oral and maxillofacial surgical procedures. Possible clinical applications may include the management of pain due to spinal disc degeneration or disease, traumatic, pathologic, or stress areas, congenital defects, or operative defects near or in any bone or between bones of the body.

According to one embodiment, the formulations described herein may be injectable, and particularly suitable for injection directly into the intervertebral disc. Injecting a low viscosity liquid media composition that solidifies or gels in vivo may provide significant safety advantages over other methods. For example, the gel may help to prevent migration of the composition into undesirable areas. A narrow gauge needle may minimize trauma as compared to surgical implantation, and may greatly reduce the risk of infection. In some embodiments, the formulation is injectable via a minimum of a 20 ga needle. In other embodiments, the formulation is injectable via a 18 ga needle or a 16 ga needle, for example, commonly used in epidural stimulation test (EST) injections.

Figure 7:
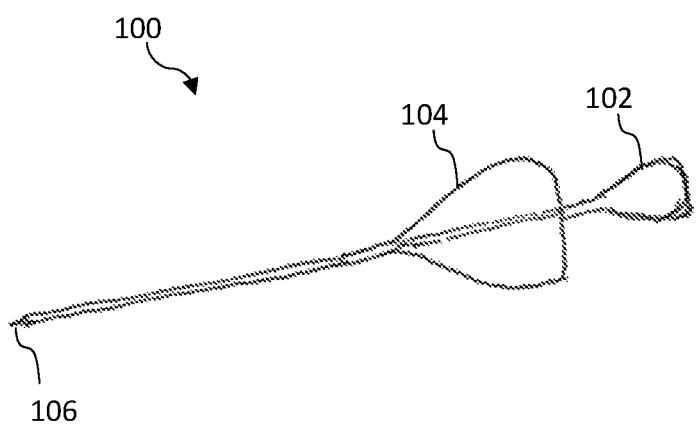
FIG. 7 depicts a delivery system for administration of an injectable microparticle composition according to one embodiment.

As shown in FIG. 7, an instrument 100 may be used to deliver the injectable formulation. For example, the instrument 100 may include a needle delivery system 102 and an optional trocar 104. A distal tip 106 of the needle 102 may be configured to pierce tissue, enter the intervertebral disc space, enter the intervertebral disc, and deliver the injectable therein. The docked trocar 104 may optionally be used to assist in guiding the needle 102 to the intervertebral disc. Injection of the formulation may be to the annulus fibrosis, the nucleus pulposus, and/or any region adjacent to the intervertebral disc or near the vertebral body. It will be appreciated that the physician may use instrument 100 in any way necessary to achieve the desired therapeutic outcome.

One method of alleviating disc pain in a subject in need thereof may include administering to the intervertebral disc of the subject a therapeutically effective amount of at least one composition containing at least one microparticle loaded with at least one active agent via a needle injection. In various aspects, the method includes delivering any of the formulations containing any of the microparticles and agents described herein.

In the case of structural implant 22, the implant 22 may be inserted into disc space 4 between adjacent vertebrae 2. Prior to insertion of the device, the intervertebral space 4 may be prepared. In one method, a discectomy may be performed where the intervertebral disc 6 is removed in its entirety or a portion is removed. The endplates of the adjacent vertebral bodies may be scraped to create an exposed end surface for facilitating bone growth across the intervertebral space 4. Optionally, one or more endoscopic tubes may be inserted into the disc space 4. One or more implants 22 may be introduced into the intervertebral space 4 and seated in an appropriate position in the intervertebral disc space 4. The implant 22 may be placed via a posterior lumbar interbody fusion (PLIF) trajectory, an anterior lumbar interbody fusion (ALIF) trajectory, a lateral lumbar interbody fusion (LLIF) trajectory, a transforaminal lumbar interbody fusion (TLIF) trajectory, or another suitable trajectory.

In the case of rollable strip 40, the strip 40 may be inserted into the disc space 4 between adjacent vertebrae 2. A discectomy may or may not be performed. Prior to insertion, the strip 40 may be rolled, for example, as shown in FIG. 4B. An endoscopic tube may be used to insert the rolled strip 40 in a minimally invasive manner. A plurality of strips 40 may be positioned at the target site, separately, adjacent to one another, or in contact with one another, to achieve the desired therapeutic effect.

In these instances, the biomaterial composition 20, for example, in the form of an injectable gel, structural implant 22, rollable strip 40, or other suitable form, may be applied directly to a target pain site. The biomaterial composition 20 preferably directly targets the pain site to provide extended pain management. The biomaterial 20 internally elutes the active therapeutic agents, such as anesthetics, antibiotics, and corticosteroids, in amounts and durations necessary to provide the desired therapeutic effects. The biomaterial 20 may also be configured to resorb or dissolve over a given period of time, thereby accurately providing long term pain relief without the need for further surgical intervention to remove the device.

Further example embodiments are directed to kits that include components for making and installing the present biomaterials and implants, including for example, the microparticles, excipients, carriers, or scaffolds, cages (e.g., titanium, polyether ether ketone (PEEK), and/or allograft spacers), delivery or insertion tools including delivery needles, or the like. Additional components, instructions and/or apparatus may also be included.

It will be further understood that various changes in the details, materials, and arrangements of the parts which have been described and illustrated in order to explain the nature of this invention may be made by those skilled in the art without departing from the scope of the invention as expressed in the claims. One skilled in the art will appreciate that the embodiments discussed above are non-limiting. It will also be appreciated that one or more features of one embodiment may be partially or fully incorporated into one or more other embodiments described herein.

What is claimed is:

1. An intervertebral implant configured to be implanted in an intervertebral disc space, the intervertebral implant comprising:
    an interbody fusion spacer having a front end, a rear end opposite the front end, an upper surface configured to engage an inferior endplate of a superior vertebral body, and a lower surface configured to engage a superior endplate of an inferior vertebral body, wherein the interbody fusion spacer comprises a plurality of biodegradable microparticles embedded in a carrier, each biodegradable microparticle of the plurality of biodegradable microparticles comprising:
    an innermost layer comprising one or more of an antibiotic or an anti-inflammatory;
    an intermediate layer encapsulating the innermost layer and comprising one or more of an antibiotic or an anti-inflammatory; and
    an outermost layer encapsulating the intermediate layer and comprising an anesthetic;
    wherein the intervertebral implant facilitates intervertebral fusion until the implant is fully resorbed,
    wherein the plurality of biodegradable microparticles include first size microparticles configured to provide extended pain relief, and second size microparticles configured to resorb and elute faster providing immediate pain relief,
    wherein the plurality of biodegradable microparticles are configured based on desired pain relief,
    wherein the first size microparticles and the second size microparticles have different diameters.

2. The intervertebral implant of claim 1, wherein the innermost layer, the intermediate layer, and the outermost layer of each of the biodegradable microparticles comprise one or more of polydioxane, polylactic-co-glycolic acid (PLGA), poly-L-lactic acid (PLLA), polycaprolactone fumarate (PCLF), polycaprolactone, or polylactic acid.

3. The intervertebral implant of claim 1, wherein the biodegradable microparticles are spherical.

4. An intervertebral spacer system configured to be implanted in an intervertebral disc space, the system comprising:
    an intervertebral implant having a front end, a rear end opposite the front end, an upper surface configured to engage an inferior endplate of a superior vertebral body, a lower surface configured to engage a superior endplate of an inferior vertebral body, and a hollow interior chamber extending from the upper surface through to the lower surface; and
    a biomaterial composition placed in the hollow interior chamber, on one or more surfaces of the intervertebral implant as a surface coating, or both in the hollow interior chamber and on one or more surfaces of the intervertebral implant as a surface coating, wherein the biomaterial composition comprises a plurality of biodegradable microparticles, each biodegradable microparticle of the plurality of biodegradable microparticles comprising:
    an innermost layer comprising one or more of an antibiotic or an anti-inflammatory;
    an intermediate layer encapsulating the innermost layer and comprising one or more of an antibiotic or an anti-inflammatory; and
    an outermost layer encapsulating the intermediate layer and comprising an anesthetic, wherein the plurality of biodegradable microparticles include first size microparticles configured to provide extended pain relief, and second size microparticles configured to resorb and provide immediate pain relief, wherein the plurality of biodegradable microparticles are configured based on desired pain relief wherein the first size microparticles and the second size microparticles have different diameters.

5. A method of alleviating disc pain in a subject in need thereof, the method comprising:

positioning an intervertebral implant in a disc spaced between adjacent vertebrae, the intervertebral implant comprising a body having a front end, a rear end opposite the front end, an upper surface configured to engage an inferior endplate of a superior vertebral body, and a lower surface configured to engage a superior endplate of an inferior vertebral body, wherein the body comprises a plurality of biodegradable microparticles embedded in a carrier, each biodegradable microparticle of the plurality of biodegradable microparticles comprising:

an innermost layer comprising one or more of an antibiotic or an anti-inflammatory;

an intermediate layer encapsulating the innermost layer and comprising one or more of an antibiotic or an anti-inflammatory; and an outermost layer encapsulating the intermediate layer and comprising an anesthetic;

wherein the plurality of biodegradable microparticles include first size microparticles configured to provide extended pain relief, and second size microparticles configured to resorb and provide immediate pain relief, wherein the plurality of biodegradable microparticles are configured based on desired pain relief wherein the first size microparticles and the second size microparticles have different diameters.

6. The intervertebral implant of claim 1, wherein the carrier comprises a synthetic polymer that is biodegradable or bioerodible.

7. The intervertebral implant of claim 1, wherein each microparticle of the plurality of biodegradable microparticles has an average diameter of 50-200 microns.

8. The intervertebral implant of claim 1, wherein each of the innermost layer, intermediate layer, and outermost layers of each microparticle has a thickness of 1-500 microns.

9. The intervertebral implant of claim 1, wherein one or more of the antibiotic of the innermost layer or the antibiotic of the intermediate layer comprises vancomycin.

10. The intervertebral implant of claim 1, wherein one or more of the anti-inflammatory of the innermost layer or the anti-inflammatory of the intermediate layer comprises a corticosteroid.

11. The intervertebral implant of claim 1, wherein the anesthetic of the outermost layer comprises one or more of novocaine or bupivacaine.

12. The system of claim 4, wherein the biomaterial composition comprises a carrier.

13. The system of claim 12, wherein the carrier comprises a synthetic polymer that is biodegradable or bioerodible.

14. The system of claim 4, wherein each microparticle of the plurality of biodegradable microparticles has an average diameter of 50-200 microns.

15. The system of claim 4, wherein each of the innermost layer, intermediate layer, and outermost layers of each microparticle has a thickness of 1-500 microns.

16. The system of claim 4, wherein one or more of the antibiotic of the innermost layer or the antibiotic of the intermediate layer comprises vancomycin.

17. The system of claim 4, wherein one or more of the anti-inflammatory of the innermost layer or the anti-inflammatory of the intermediate layer comprises a corticosteroid.

18. The system of claim 4, wherein the anesthetic of the outermost layer comprises one or more of novocaine or bupivacaine.

19. The system of claim 4, wherein the implant comprises one or more of titanium, stainless steel, a titanium alloy, a non-titanium metallic alloy, a polymeric material, a plastic, a plastic composite, polyether ether ketone, a ceramic, or an elastic material.

20. The of claim 4, wherein the innermost layer, the intermediate layer, and the outermost layer of each of the biodegradable microparticles comprise one or more of polydioxane, polylactic-co-glycolic acid (PLGA), poly-L-lactic acid (PLLA), polycaprolactone fumarate (PCLF), polycaprolactone, or polylactic acid.

* * * * *